United States Patent
Kim et al.

(10) Patent No.: US 12,513,513 B2
(45) Date of Patent: Dec. 30, 2025

(54) METHOD FOR PROVIDING ULTRA-WIDEBAND RANGING-BASED SERVICE AND DEVICE SUPPORTING THE SAME

(71) Applicant: SAMSUNG SDS CO., LTD., Seoul (KR)

(72) Inventors: Dong Ho Kim, Seoul (KR); Hong Chul Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 469 days.

(21) Appl. No.: 18/198,083

(22) Filed: May 16, 2023

(65) Prior Publication Data

US 2023/0379698 A1    Nov. 23, 2023

(30) Foreign Application Priority Data

May 23, 2022    (KR) .................. 10-2022-0062813
Jul. 26, 2022    (KR) .................. 10-2022-0092184

(51) Int. Cl.
*H04W 12/03*    (2021.01)
*H04L 9/08*    (2006.01)
*H04W 12/50*    (2021.01)

(52) U.S. Cl.
CPC ........... *H04W 12/03* (2021.01); *H04L 9/0822* (2013.01); *H04W 12/50* (2021.01)

(58) Field of Classification Search
CPC ...... H04W 12/03; H04W 12/50; H04L 9/0822
See application file for complete search history.

(56) References Cited

U.S. PATENT DOCUMENTS

| | | |
|---|---|---|
| 2021/0099862 A1 | 4/2021 | Yang et al. |
| 2021/0112548 A1 | 4/2021 | de Perthuis et al. |
| 2021/0173064 A1 | 6/2021 | Yoon et al. |
| 2022/0066010 A1 | 3/2022 | Henry et al. |
| 2022/0141657 A1* | 5/2022 | Hammerschmidt ........ H04L 25/0224 726/3 |

FOREIGN PATENT DOCUMENTS

| | | | | |
|---|---|---|---|---|
| CN | 102595228 A | * | 7/2012 | ......... H04N 21/4532 |
| DE | 102022200328 A1 | * | 7/2022 | ........... G01C 21/165 |
| KR | 10-1704567 B1 | | 2/2017 | |
| KR | 10-2019-0042853 A | | 4/2019 | |
| WO | WO-2014171620 A1 | * | 10/2014 | ........... H04L 12/281 |
| WO | 2021/118175 A1 | | 6/2021 | |
| WO | 2022/053186 A1 | | 3/2022 | |

* cited by examiner

*Primary Examiner* — Duc C Ho
(74) *Attorney, Agent, or Firm* — Sughrue Mion, PLLC

(57) ABSTRACT

A method for providing an ultra-wideband (UWB) ranging-based service and devices supporting the same are provided. The method according to some embodiments includes synchronizing, by a first device, a first service application of the first device with a second service application of a second device based on synchronization information received from the second device, the second service application of the second device being an application configured to perform an operation for a UWB ranging-based service in association with a service device; and performing, by the first device, the operation for the UWB ranging-based service in association with the service device, based on the synchronized first service application.

17 Claims, 18 Drawing Sheets

METHOD FOR PROVIDING ULTRA-WIDEBAND RANGING-BASED SERVICE AND DEVICE SUPPORTING THE SAME

CROSS-REFERENCE TO RELATED APPLICATION(S)

This application claims priority from Korean Patent Application No. 10-2022-0062813 filed on May 23, 2022 and Korean Patent Application No. 10-2022-0092184 filed on Jul. 26, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method for providing an ultra-wideband (UWB) ranging-based service and a device supporting the same.

2. Description of the Related Art

Recently, an ultra-wideband (UWB) communication method has begun to be used for accurate distance measurement and security-enhanced data transmission. In particular, the UWB communication method has attracted great attention as a technology that enables precise measurement of relative positions or a distance between devices indoors and outdoors, access control of buildings or vehicles without contact, payment in stores or public transportations, or the like.

Meanwhile, currently, the UWB communication method considers only direct communication (connection) between the devices. Accordingly, when a user rides in a vehicle, even though a mobile device of the user supports UWB communication, a UWB ranging-based service may not be appropriately used. This is because a UWB signal is attenuated by the vehicle, such that UWB communication between the mobile device and a service device positioned outside the vehicle (i.e., a device providing the UWB ranging-based service) may not be smoothly performed. Even though the UWB communication is possible between the mobile device and the service device, the user should use a narrow screen of the mobile device rather than a wide screen provided by the vehicle (e.g., a screen of a navigation device), which is unreasonable and inconvenient.

SUMMARY

Aspects of the present disclosure provide a method capable of providing a ultra-wideband (UWB) ranging-based service in a more user-friendly manner, and a device supporting the same.

Aspects of the present disclosure also provide a method capable of improving security of a UWB ranging-based service in providing the UWB ranging-based service through linkage between devices, and devices supporting the same.

Aspects of the present disclosure also provide various service scenarios to which a UWB ranging-based service through linkage between devices may be applied.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of an example embodiment of the present disclosure, provided is a method for providing an ultra-wideband (UWB) ranging-based service, the method including: synchronizing, by a first device, a first service application of the first device with a second service application of a second device based on synchronization information received from the second device, the second service application of the second device being an application configured to perform an operation for a UWB ranging-based service in association with a service device; and performing, by the first device, the operation for the UWB ranging-based service in association with the service device, based on the synchronized first service application.

The first device may be a device mounted in a vehicle, and the second device may be a mobile device of a user.

The method may further include controlling, by the first device, to display a result of the performing the operation through a display of the vehicle.

The synchronizing may include: establishing a secure channel with the second device; and sharing an encryption key with the second device through the secure channel, the encryption key being a key based on which session data for UWB ranging is to be encrypted.

The encryption key may be a key different from an encryption key shared in a previous synchronization process between the first device and the second device.

The performing the operation may include: receiving, from the second device, session data encrypted by the shared encryption key; decrypting the received session data based on the encryption key; and performing the UWB ranging in association with the service device based on the decrypted session data.

The receiving the session data may include: transmitting, to the second device, a one-time code and a request for the session data; and receiving, from the second device, the session data encrypted by the shared encryption key and the one-time code.

The received session data may include: a session ID encrypted by the one-time code; and a session key encrypted by the shared encryption key and the one-time code.

The one-time code may be generated by a fine ranging (FiRa) applet driven in a secure element (SE) of the first device.

The performing the operation may include: relaying a message for establishing a secure channel between the service device and the second device, the secure channel being established between the service device and the second device as a result of relaying the message; receiving session data for UWB ranging from the second device; and performing the UWB ranging in association with the service device based on the received session data.

The service device may operate in a static scrambled timestamp sequence (STS) mode, and the performing the operation may include: sharing session data with the service device; and performing UWB ranging in association with the service device based on the shared session data.

According to an aspect of an example embodiment of the present disclosure, provided is a method for providing an ultra-wideband (UWB) ranging-based service, the method including: synchronizing, by a second device, a second service application of the second device with a first service application of a first device by transmitting synchronization information to the first device, the second service application of the second device being an application configured to perform an operation for a UWB ranging-based service in association with a service device; and transmitting, by the second device to the first device, session data for UWB ranging, based on which the UWB ranging is performed between the service device and the first device.

The synchronizing may include: establishing a secure channel with the first device; and sharing an encryption key with the first device through the secure channel, and the transmitting the session data may include: encrypting the session data with the shared encryption key; and transmitting the encrypted session data to the first device.

The session data may include a session ID and a session key, and the encrypting the session data may include: encrypting the session ID based on a one-time code received from the first device; and encrypting the session key based on the one-time code and the shared encryption key.

The encryption key may be a key different from an encryption key shared in a previous synchronization process between the first device and the second device.

The service device may operate in a dynamic static scrambled timestamp sequence (STS) mode, and the service device may establish a secure channel with the second device through relay of the first device.

According to an aspect of an example embodiment of the present disclosure, provided is a device including: at least one processor; a communication interface configured to communicate with a service device and another device; and at least one memory configured to store one or more instructions, wherein the at least one processor, based on executing the one or more instructions, is caused to perform: synchronizing a first service application of the device with a second service application of the another device based on synchronization information received from the another device, the second service application of the another device being an application configured to perform an operation for an ultra-wideband (UWB) ranging-based service in association with the service device; and performing the operation for the UWB ranging-based service in association with the service device, based on the first service application.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
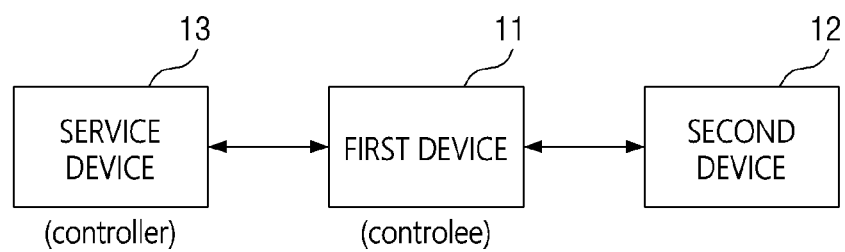
FIGS. 1 and 2 are diagrams for describing an illustrative environment in which an ultra-wideband (UWB) ranging-based service according to some exemplary embodiments of the present disclosure is provided.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims and their equivalents.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, various exemplary embodiments of the present disclosure will be described in detail with reference to the accompanying drawings.

FIG. 1 is an illustrative diagram for describing an environment in which an ultra-wideband (UWB) ranging-based service according to some exemplary embodiments of the present disclosure is provided.

As illustrated in FIG. 1, a UWB ranging-based service according to exemplary embodiments may be provided through linkage between a service device 13, a first device 11, and a second device 12. However, the scope of the present disclosure is not limited thereto, and in some cases, a third device (not illustrated) may be further linked. Hereinafter, each device will be described.

The service device 13 may be a provider-side device of the UWB ranging-based service. For example, the service device 13 may provide the UWB ranging-based service to a user by performing a service operation (e.g., UWB ranging, etc.) with the first device 11 and/or the second device 12. Here, the UWB ranging-based service refers to any service provided using a UWB ranging result (i.e., a distance measurement result), and some examples of such a service will be described with reference to FIGS. 14 to 17. Hereinafter, for convenience of explanation, the terms 'UWB ranging-based service' and 'service' may be used interchangeably.

The service device 13 may be installed with a service application in which the UWB ranging-based service (or a service operation) is implemented, and may perform the service operation with the devices 11 and 12 through the service application. The service application may be, for example, an application in which a controller-side function and a service provider-side function according to fine ranging (FiRa) specifications are implemented (e.g., a FiRa-enabled application on the FiRa specifications). That is, the service application may perform UWB ranging according to a method (protocol) defined in the FiRa specifications and provide a service to the user using a ranging result.

For reference, a fine ranging (FiRa) consortium is an organization of related companies gathered in order to define a standardized UWB communication method, and is currently defining technical specifications (i.e., FiRa specifications) regarding a method for conveniently using a UWB technology, authentication, and security.

The service device 13 may have a proximity (or short range) communication module. For example, the service device 13 may include one or more communication modules supporting at least some of communication methods such as near field communication (NFC), Bluetooth, Bluetooth low energy (BLE), UWB, and wireless fidelity (WiFi). In addition, the service device 13 may further include another type of communication module (e.g. a wired communication module).

Next, the first device 11 may be a device that is linked to the second device to perform a service operation with the service device 13. For example, the first device 11 may provide the UWB ranging-based service to the user by performing UWB ranging with the service device 13 instead of the second device 12 (i.e., becoming a controlee side to perform ranging). A UWB ranging process will be described in detail later with reference to FIGS. 8 to 13.

The first device 11 may be, for example, a device mounted in a vehicle, but the scope of the present disclosure is not limited thereto. Here, the vehicle may be a concept including not only a car but also all transportation means (e.g., a drone, etc.) in which persons may ride.

A service application configured (implemented) to perform the service operation with the service device 13 may be installed in the first device 11. Such a service application may be, for example, an application in which a controlee-side function and a service user-side function according to the FiRa specifications are implemented, and may be installed in the first device 11 through a synchronization process with the second device 12. However, the scope of the present disclosure is not limited thereto. The synchronization process will be described in detail later with reference to FIGS. 4 to 7.

The first device 11 may also include a proximity (or short range) communication module. For example, the first device 11 may include one or more communication modules supporting at least some of communication methods such as NFC, Bluetooth, BLE, UWB, and WiFi. In addition, the first device 11 may further include another type of communication module such as a universal serial bus (USB).

Next, the second device 12 may be a user-side device (e.g., a mobile device of a user) using the UWB ranging-based service. The second device 12 may provide the first device 11 with information (e.g., synchronization information, session data, etc.) necessary for the first device 11 to perform the service operation with the service device 13, and accordingly, the user may use the UWB ranging-based service through the first device 11 without taking specific measures.

A service application configured (implemented) to perform a service operation with the service device 13 may be installed in the second device 12. The second device 12 may provide service application information to the first device 11 through a synchronization process and, in some cases, may also provide session data for UWB ranging, which will be described later. The service application may be, for example, an application in which a controlee-side function and a service-user side function according to the FiRa specifications are implemented.

The second device 12 may also include a proximity (or short range) communication module. For example, the second device 12 may include one or more communication modules supporting at least some of communication methods such as NFC, Bluetooth, BLE, UWB, and WiFi. In addition, the second device 12 may further include another type of communication module such as a USB.

An illustrative environment in which a UWB ranging-based service according to exemplary embodiments is provided will be described in detail with reference to FIG. 2 in order to provide more convenience of understanding.

Figure 2:
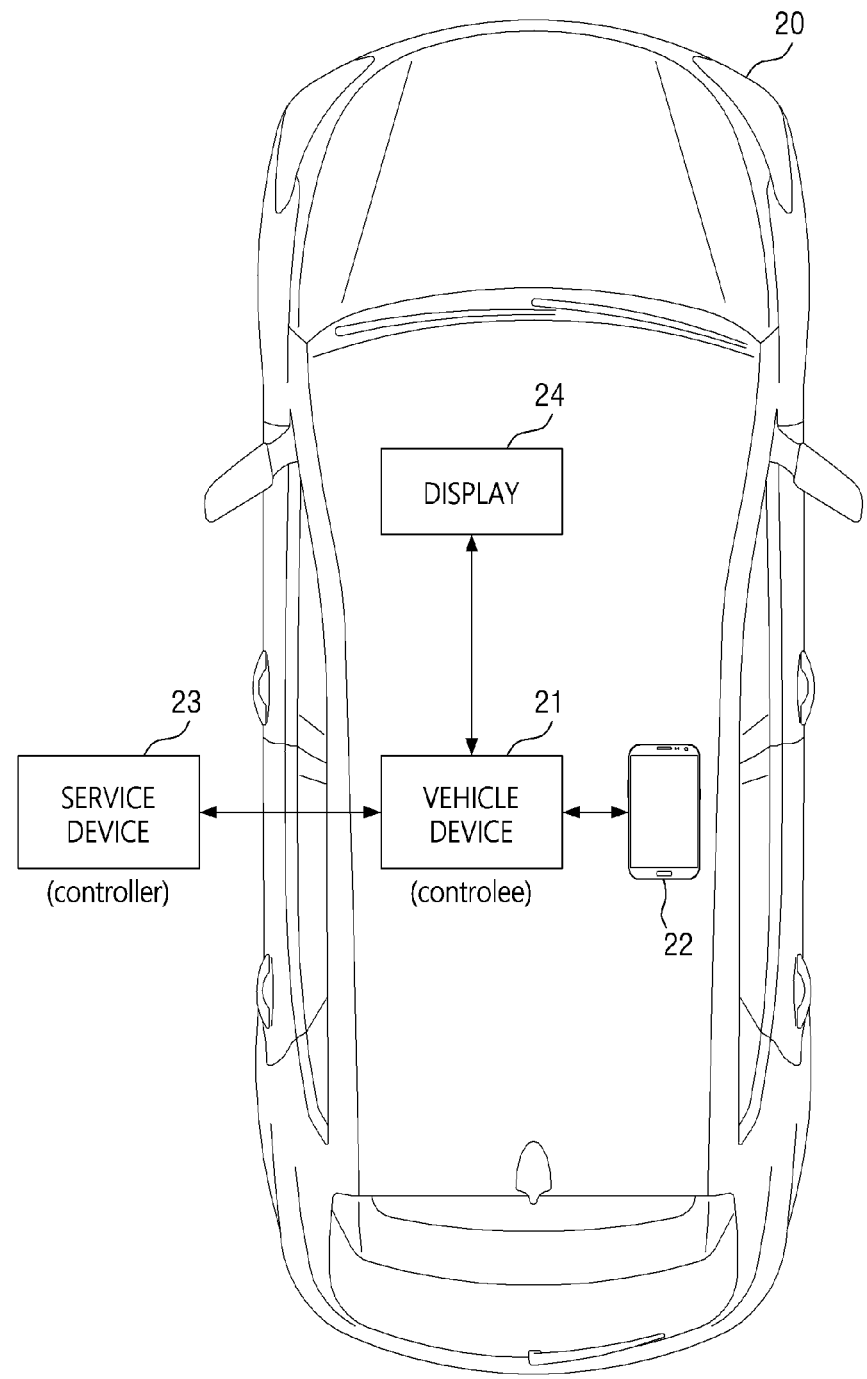

FIG. 2 illustrates an environment in which a service device 23, a vehicle device 21, and a mobile device 22 are linked to each other to provide a UWB ranging-based service to a user. It may be understood that the service device 23, the vehicle device 21, and the mobile device 22 illustrated in FIG. 2 correspond to the service device 13, the first device 11, and the second device 12 illustrated in FIG. 1, respectively.

As illustrated in FIG. 2, the vehicle device 21 mounted in the vehicle 20 may provide a UWB ranging-based service to the user by performing a service operation with the service device 23.

Specifically, the vehicle device 21 may perform a service operation with the service device 23 through a service application synchronized with the mobile device 22. For example, the vehicle device 21 may perform a service operation such as UWB ranging with the service device 23 and display a performance result of the service operation through a display 24 (e.g., a display of an navigation device). In this manner, the user may conveniently use the UWB ranging-based service through the vehicle device 21 without taking special measures (e.g., installation of a service application in the vehicle device 21, service subscription, UWB communication setting, etc.).

For reference, the vehicle device 21 may perform more accurate (precise) UWB ranging with the service device 23 using a plurality of UWB sensors (or communication modules), and thus, in the environment illustrated in FIG. 2, there is also an advantage that a higher quality UWB ranging-based service may be provided to the user.

Till now, the illustrative environment in which the UWB ranging-based service according to some exemplary embodiments of the present disclosure is provided has been described with reference to FIGS. 1 and 2. Hereinafter, an internal configuration of the devices 11 to 13 illustrated in FIG. 1 will be described in detail.

Figure 3:
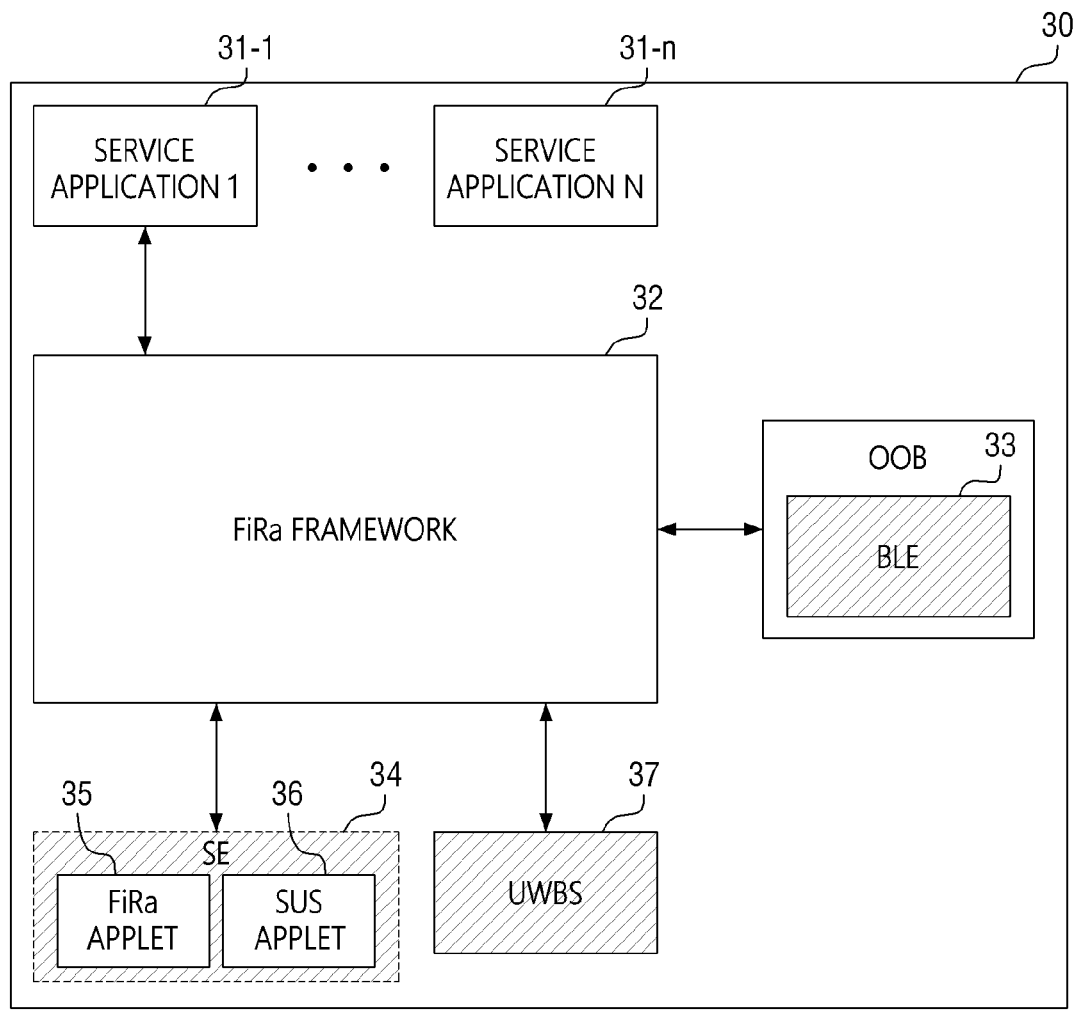
FIG. 3 is an illustrative block diagram for describing a device according to some exemplary embodiments of the present disclosure.

FIG. 3 is an illustrative block diagram illustrating a device 30 according to some exemplary embodiments of the present disclosure. The device 30 illustrated in FIG. 3 may correspond to the devices 11 to 13 described above. In addition, a module (e.g., 34) indicated by a shade in FIG. 3 refers to a hardware module. The other modules (e.g., 31-1, etc.) are software modules, and may be implemented as, for example, one or more instructions loaded into a memory (not illustrated) and executed by a processor (not illustrated).

As illustrated in FIG. 3, the device 30 according to exemplary embodiments may be configured to include one or more service applications 31-1 to 31-n, a FiRa framework 32, a BLE module 33, a secure element (SE) 34, and a UWB subsystem (UWBS) 37. However, only components related to an exemplary embodiment of the present disclosure are illustrated in FIG. 3. Accordingly, one of ordinary skill in the art to which the present disclosure pertains may recognize that the device 30 may further include other general-purpose components (e.g., a processor, a memory, an input/output interface, etc.) in addition to the components illustrated in FIG. 3. In addition, the components of the device 30 illustrated in FIG. 3 represent functional elements functionally distinguished from each other, and a plurality of components may be implemented in a form in which they are integrated with each other in an actual physical environment or a specific functional element may be implemented in a form in which it is divided into a plurality of sub-functional elements. Hereinafter, each component will be described in detail.

The service application (e.g., 31-1) may refer to an application (e.g., a controller-side or a controlee-side application) in which a UWB ranging-based service is implemented. The service application (e.g., 31-1) may use various functions defined in FiRa specifications through the FiRa framework 32. For example, the service application (e.g., 31-1) may use functions supported (provided) by applets 35 and 36 through the FiRa framework 32, and may perform UWB communication or out-of-band (OOB) communication (e.g., communication other than UWB such as BLE).

Next, the FiRa framework 32 may refer to a module supporting (providing) the various functions defined in the FiRa specifications. For a more detailed description of the FiRa framework 32, reference is made to the FiRa specifications.

Next, the SE may refer to a security area provided by the device 30. The applets 35 and 36 may be installed and driven within the SE. In some cases, the SE may be omitted from the components of the device 30. For example, when the device 30 operates only in a static scrambled timestamp sequence (STS) mode, the SE may not exist. For reference, the static STS mode may refer to a mode in which the device 30 operates without using the SE, and a dynamic STS mode may refer to a mode in which security is improved as compared with the static STS mode by using the SE. For a detailed description of the static STS mode and dynamic STS mode, reference is made to the FiRa specifications.

As illustrated in FIG. 3, a FiRa applet 35 and a secure UWB service (SUS) applet 36 may be included in the SE 34. In addition, in some cases, other applets which are defined in the FiRa specifications (or in which functions defined in the FiRa specifications are implemented) may be further included in the SE 34. For functions supported (provided) by the FiRa applet 35 and the SUS applet 36 or operations of the FiRa applet 35 and the SUS applet 36, reference is made to description contents of FIG. 4 and subsequent drawings and the FiRa specifications.

Next, the UWB subsystem (UWBS) may support (provide) a UWB communication related function. For a more detailed description of the UWBS 37, reference is made to the FiRa specifications.

Next, the BLE module 33 may support (provide) a BLE communication related function.

For reference, the device 30 may further include a communication module for supporting other OOB communication (e.g., WiFi, etc.) in addition to BLE. In addition, the device 30 may further include various types of communication modules (e.g., NFC, USB, etc.) as described above.

Till now, the internal configuration of the device 30 according to some exemplary embodiments of the present disclosure has been described with reference to FIG. 3. Hereinafter, a method for providing a UWB ranging-based service through linkage between devices will be described in detail with reference to FIG. 4 and subsequent drawings. However, for convenience of understanding, a description will be provided on the assumption that a UWB ranging-based service is provided in the environment illustrated in FIG. 2. However, the scope of the present disclosure is not limited thereto.

Figure 4:
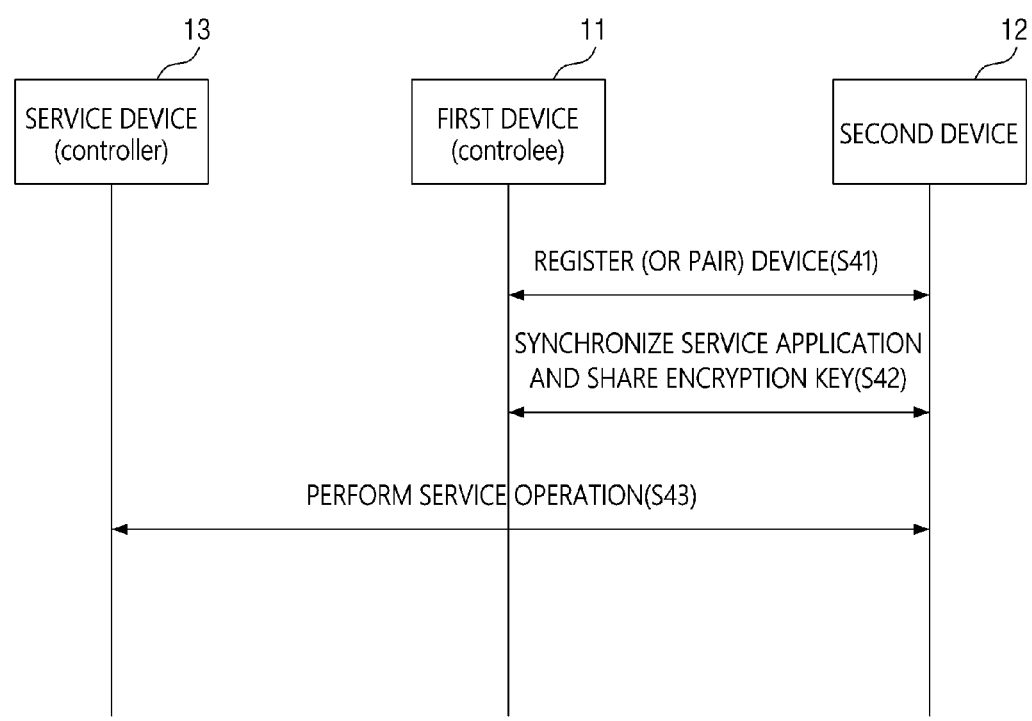
FIG. 4 is an illustrative flowchart schematically illustrating a method for providing a UWB ranging-based service according to some exemplary embodiments of the present disclosure.

FIG. 4 is an illustrative flowchart schematically illustrating a method for providing a UWB ranging-based service according to some exemplary embodiments of the present disclosure.

As illustrated in FIG. 4, the method for providing a UWB ranging-based service according to exemplary embodiments may start in step S41 of registering (or pairing) the second device 12 with the first device 11. The present step may be understood as a process of permitting connection between the devices 11 and 12 so that communication may be performed between the devices 11 and 12. For example, the present step may be understood as a process of registering (or pairing) the mobile device (e.g., 22) of the user with the vehicle device (e.g., 21), and in some cases, may be performed only 'once' for the first time.

In step S42, a service application may be synchronized between the second device 12 and the first device 11, and an encryption key may be shared between the second device 12 and the first device 11. The present step may be understood as a synchronization process automatically performed whenever the second device 12 is connected to the first device 11. Hereinafter, the present step will be described in detail with reference to FIG. 5. For a description of components 51-1 to 56-1 and 51-2 to 56-2 of the devices 11 and 12 illustrated in FIG. 5, reference is made to description contents of FIG. 3.

Figure 5:
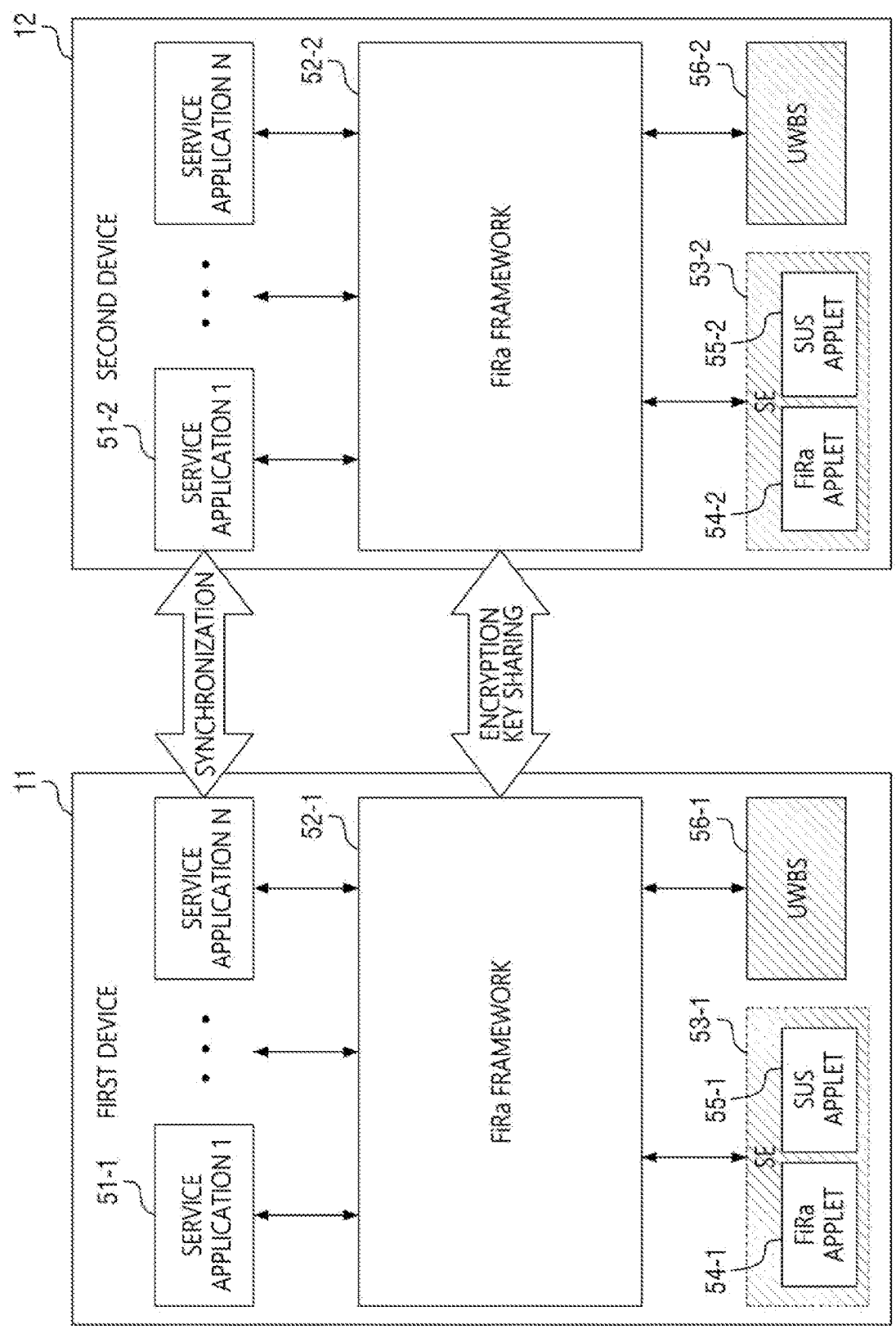
FIG. 5 is an illustrative diagram for describing, in detail, a process in which service application synchronization and encryption key sharing are performed between devices according to some exemplary embodiments of the present disclosure.

As illustrated in FIG. 5, synchronization may be performed between service applications 51-1 and 51-2 of the two devices 11 and 12. For example, the first device 11 may receive synchronization information on the service application 51-2 from the second device 12, and synchronize its service application 51-1 with the service application 51-2 of the second device 12 using the received synchronization information. The synchronization information may include various information (e.g., a service application itself, data managed by the service application, etc.) for driving (executing) the same application 51-1 as the service application 51-2 of the second device 12 in the first device 11. The synchronization information may be transmitted to the first device 11 through a communication interface such as USB, Bluetooth, BLE, NFC, etc., but the scope of the present disclosure is not limited thereto. For reference, such a synchronization function may be supported (provided) by a platform (e.g., Android Auto) installed in the first device 11.

Next, the encryption key may be shared through FiRa frameworks 52-1 and 52-2 and FiRa applets 54-1 and 54-2 of the two devices 11 and 12. The encryption key may be a key used to securely share session data of the second device 12. Details of an encryption key sharing process will be described in more detail later with reference to FIGS. 6 and 7. The encryption key may be shared, for example, through an OOB communication (e.g., BLE, etc.) interface linked with the FiRa frameworks 52-1 and 52-2, but the scope of the present disclosure is not limited thereto.

A description will be provided with reference to FIG. 4 again.

In step S43, operations for the UWB ranging-based service may be performed. For example, the first device 11 may drive (execute) the service application (e.g., 51-1 in FIG. 5) synchronized with the second device 12, and perform UWB ranging with the service device 13 through the driven service application. In this case, since session data for UWB ranging does not exist in the first device 11 (that is, information in the SE or information generated by the applet (e.g., session data) is not synchronized because the above-described synchronization process is a process of synchronizing only application-level information), the first device 11 may perform UWB ranging using the session data of the second device 12 (in a case of the dynamic STS mode). It may be understood that the above-described encryption key is used for the first device 11 to securely acquire the session data of the second device 12. In addition, the first device 11 may further perform another service operation with the service device 13 based on a ranging result and may display a performance result of another service operation through a display. A UWB ranging process will be described in more detail later with reference to FIGS. 8 to 13.

Till now, the method for providing a UWB ranging-based service according to some exemplary embodiments of the present disclosure has been schematically described with reference to FIGS. 4 and 5. Hereinafter, an encryption key sharing process and a UWB ranging process will be described in detail with reference to FIG. 6 and subsequent drawings.

Hereinafter, an encryption key sharing process according to some exemplary embodiments of the present disclosure will be described with reference to FIGS. 6 and 7.

Figure 6:
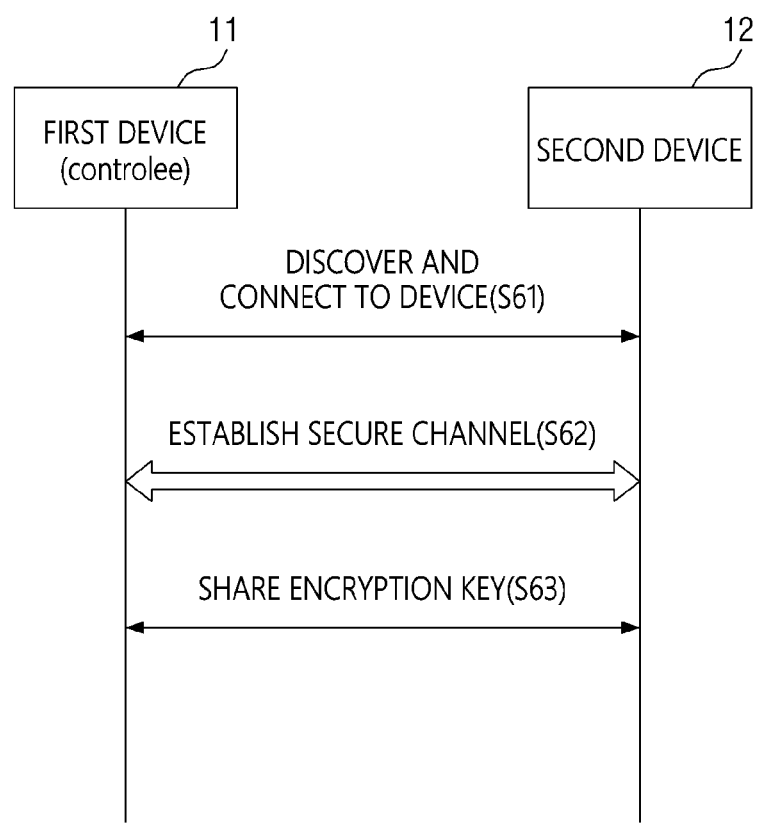
FIG. 6 is an illustrative flowchart illustrating an encryption key sharing process according to some exemplary embodiments of the present disclosure.

As illustrated in FIG. 6, the encryption key sharing process according to exemplary embodiments may start in step S61 in which the first device 11 discovers and connects to the second device 12. For example, the first device 11 may search for peripheral devices through an OOB communication method such as BLE, and connect a communication channel with the searched device 12.

Figure 7:
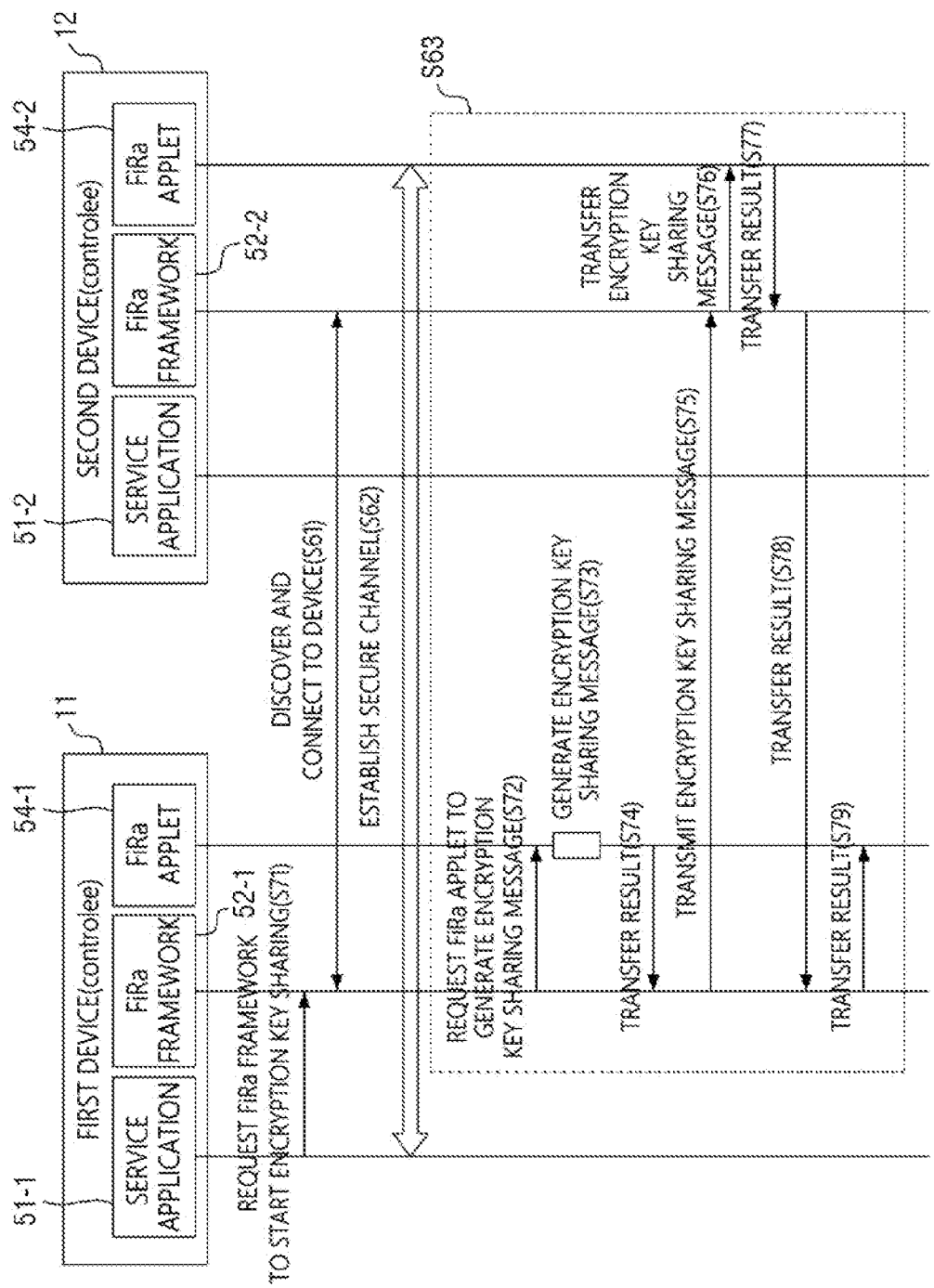
FIG. 7 is an illustrative detailed flowchart illustrating the encryption key sharing process according to some exemplary embodiments of the present disclosure.

As illustrated in FIG. 7, step S61 may be performed through the FiRa framework 52-1 of the first device 11 and the FiRa framework 52-2 of the second device 12, and the framework 52-1 may initiate the encryption key sharing process in response to a request from the service application 51-1 or another module (S71). For example, the service application 51-1 may initiate the encryption key sharing process by calling an application programming interface (API) of the FiRa framework 52-1 after the synchronization is completed (or during the synchronization). For reference, the API has not been yet defined in the FiRa specifications, and thus, needs to be newly defined and added.

In step S62, a secure channel may be established between the first device 11 and the second device 12. Since the secure channel may be established according to a method (protocol) defined in the FiRa specifications, reference is made to the FiRa specifications for the detailed process of the present step. For reference, the FiRa specifications have defined a process of establishing a secure channel through 'INITIATE TRANSACTION', 'SELECT', 'GENERAL AUTHENTICATE PART1', 'GENERAL AUTHENTICATE PART2' commands (or messages), and the like.

In step S63, an encryption key may be shared between the first device 11 and the second device 12. Hereinafter, the present step will be described in more detail with reference to FIG. 7.

As illustrated in FIG. 7, in step S72, the FiRa framework 52-1 of the first device 11 may request the FiRa applet 54-1 to generate an encryption key sharing message. Since the secure channel has been established, such a request may be implemented through 'TUNNEL' and TUT DATA' commands. However, the scope of the present disclosure is not limited thereto.

In steps S73 and S74, the FiRa applet 54-1 may generate the encryption key sharing message in response to the request of the FiRa framework 52-1. The generated encryption key sharing message may be transferred to the FiRa framework 52-1. For example, the FiRa applet 54-1 may generate an encryption key and generate the encryption key sharing message including the encryption key. A method for generating the encryption key by the FiRa applet 54-1 may be any method. For example, the FiRa applet 54-1 may use a random value or a value obtained by processing the random value as the encryption key.

In some exemplary embodiments, the encryption key may be changed whenever synchronization is performed. That is, the encryption key sharing process may be performed whenever the service applications 51-1 and 51-2 are synchronized with each other, and an encryption key shared in a current synchronization process may be different from an encryption key shared in the previous synchronization process. In this manner, the session data of the second device 12 may be safely shared with the first device 11, and UWB ranging between the first device 11 and the service device 13 may also be safely performed.

In step S75, the FiRa framework 52-1 of the first device 11 may transmit the encryption key sharing message to the FiRa framework 52-2 of the second device.

In step S76, the FiRa framework 52-2 may transmit the encryption key sharing message to the FiRa applet 54-2. In this case, the FiRa applet 54-2 may store the encryption key included in the encryption key sharing message.

In steps S77 to S79, an encryption key sharing result (i.e., a storage result of the FiRa applet 54-2) may be transferred to the FiRa applet 54-1 through the FiRa frameworks 52-1 and 52-2 of the two devices 11 and 12. For reference, result transfer (message/data transfer) from the FiRa framework (e.g., 52-1) to the FiRa applet (e.g., 54-1) may be implemented through a 'DISPATCH' command defined in the FiRa specifications.

Meanwhile, it has been illustrated by way of example in FIG. 7 that the first device 11 shares the encryption key by transmitting the encryption key to the second device 12, but in some cases, the second device 12 may also share the encryption key by generating the encryption key and transmitting the encryption key to the first device 11.

Till now, the encryption key sharing process according to some exemplary embodiments of the present disclosure has been described with reference to FIGS. 6 and 7. As described above, the session data of the second device 12 may be safely shared with the first device 11 using the encryption key shared in the synchronization process of the service application. Accordingly, security of the UWB ranging-based service may be sufficiently ensured.

Hereinafter, a UWB ranging process will be described in detail with reference to FIGS. 8 to 13.

First, a UWB ranging process according to some exemplary embodiments of the present disclosure will be described with reference to FIGS. 8 and 9.

Figure 8:
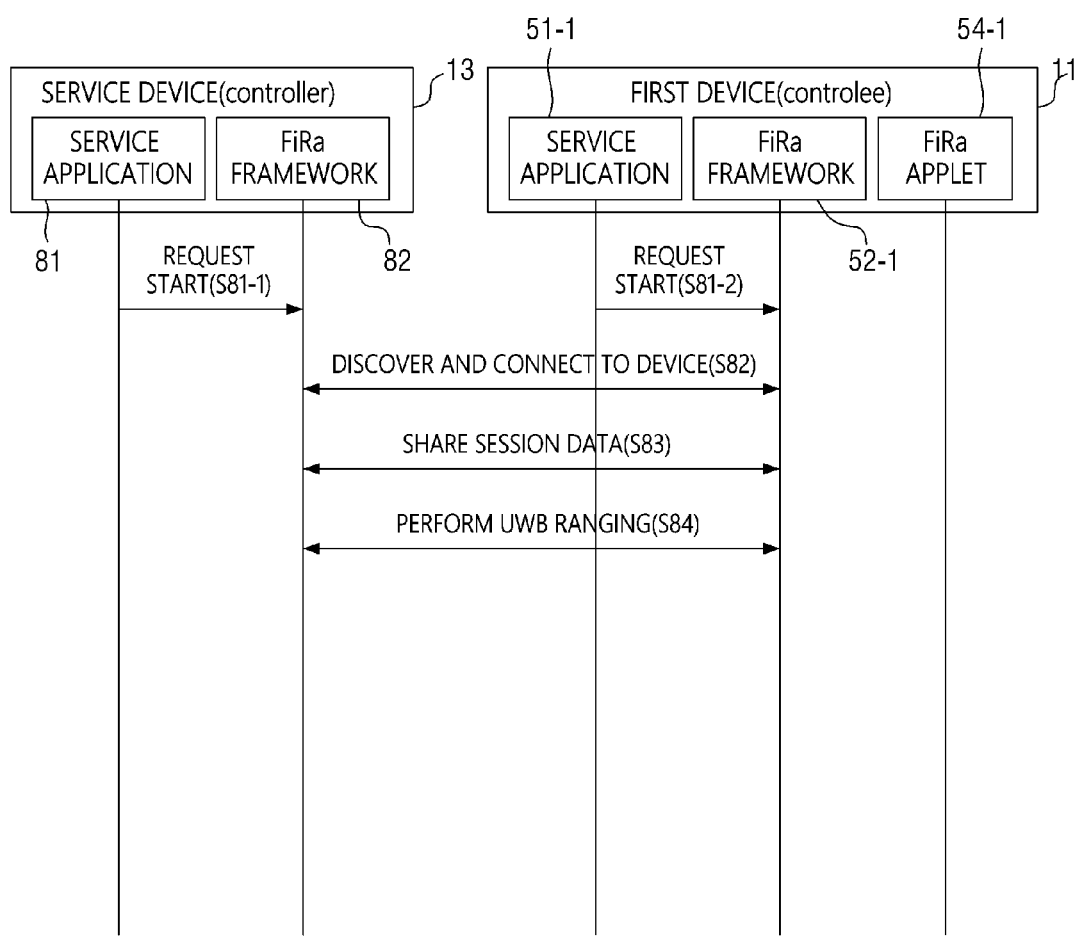
FIG. 8 is an illustrative flowchart illustrating a UWB ranging process according to some exemplary embodiments of the present disclosure.
Figure 9:
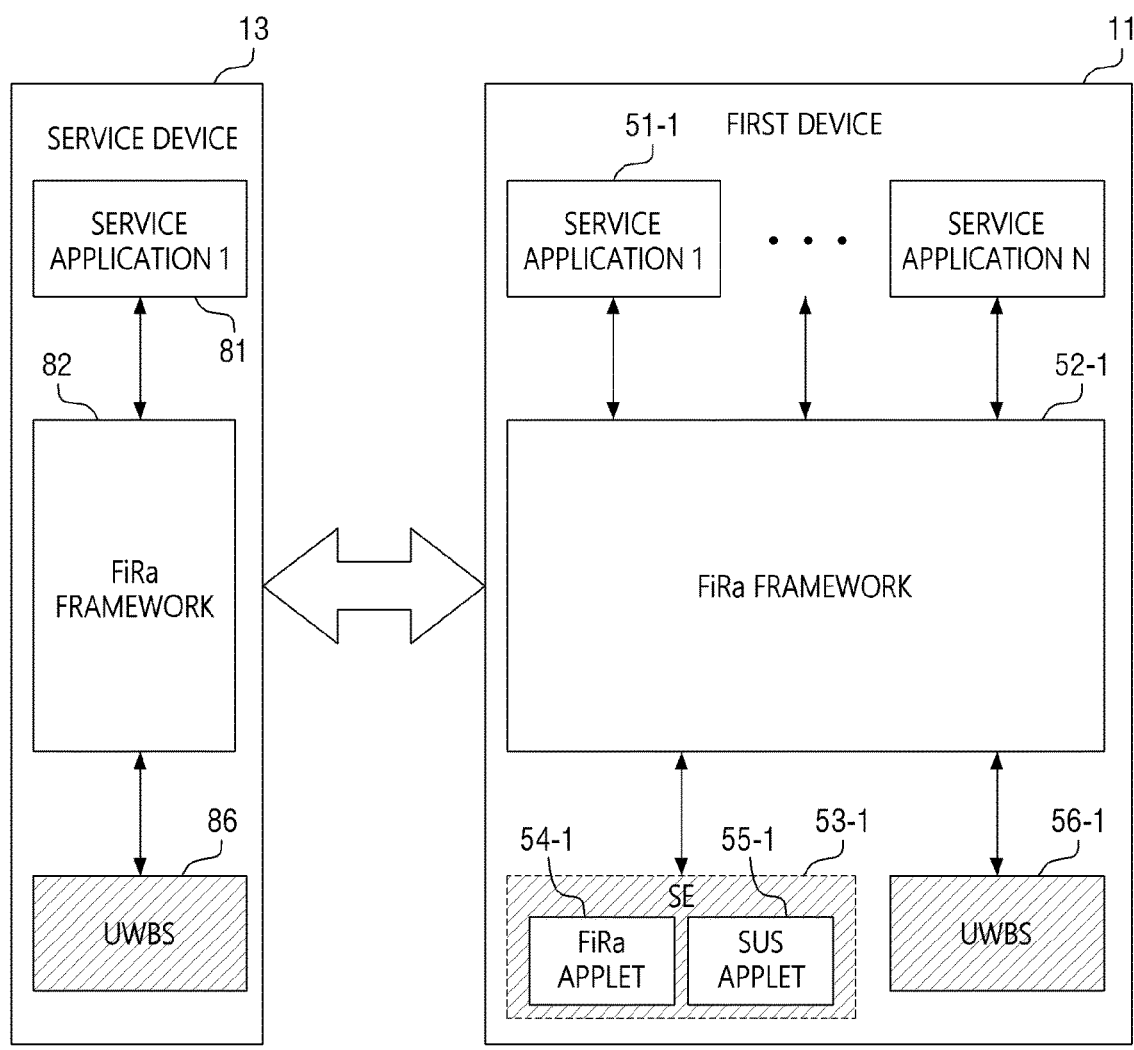
FIG. 9 is an illustrative diagram for describing the UWB ranging process according to some exemplary embodiments of the present disclosure in detail.

As illustrated in FIG. 8, the present exemplary embodiments relate to a process in which UWB ranging is performed in a static STS mode defined in the FiRa specifications. As described above, the static STS mode may refer to a mode that does not use the SE. As illustrated in FIG. 9, the service device 13 operating in the static STS mode may not include the SE. For a description of components 81, 82, and 86 of the service device 13, reference is made to the description of FIG. 3.

As illustrated in FIG. 8, the present exemplary embodiments may start in step S81-1 (or S81-2) of requesting FiRa frameworks 52-1 and 82 to start (initiate) a FiRa service. For example, an application 81 of the service device 13 may request a FiRa framework 82 to start a FiRa service in the static STS mode.

In step S82, the service device 13 may discover the first device 11 and connect a communication channel with the first device 11. For example, the service device 13 may search for (scan) peripheral devices using an OOB communication method such as BLE and connect a communication channel with the searched device 11.

In step S83, session data may be shared between the service device 13 and the first device 11. For a detailed process of the present step, reference is made to the FiRa specifications.

In step S84, UWB ranging may be performed between the service device 13 and the first device 11. For a detailed process of the present step, reference is made to the FiRa specifications.

Hereinafter, a UWB ranging process according to some other exemplary embodiments of the present disclosure will be described with reference to FIGS. 10 to 13. However, for clarity of the present disclosure, a description of contents overlapping those of the previous exemplary embodiments will be omitted.

Figure 10:
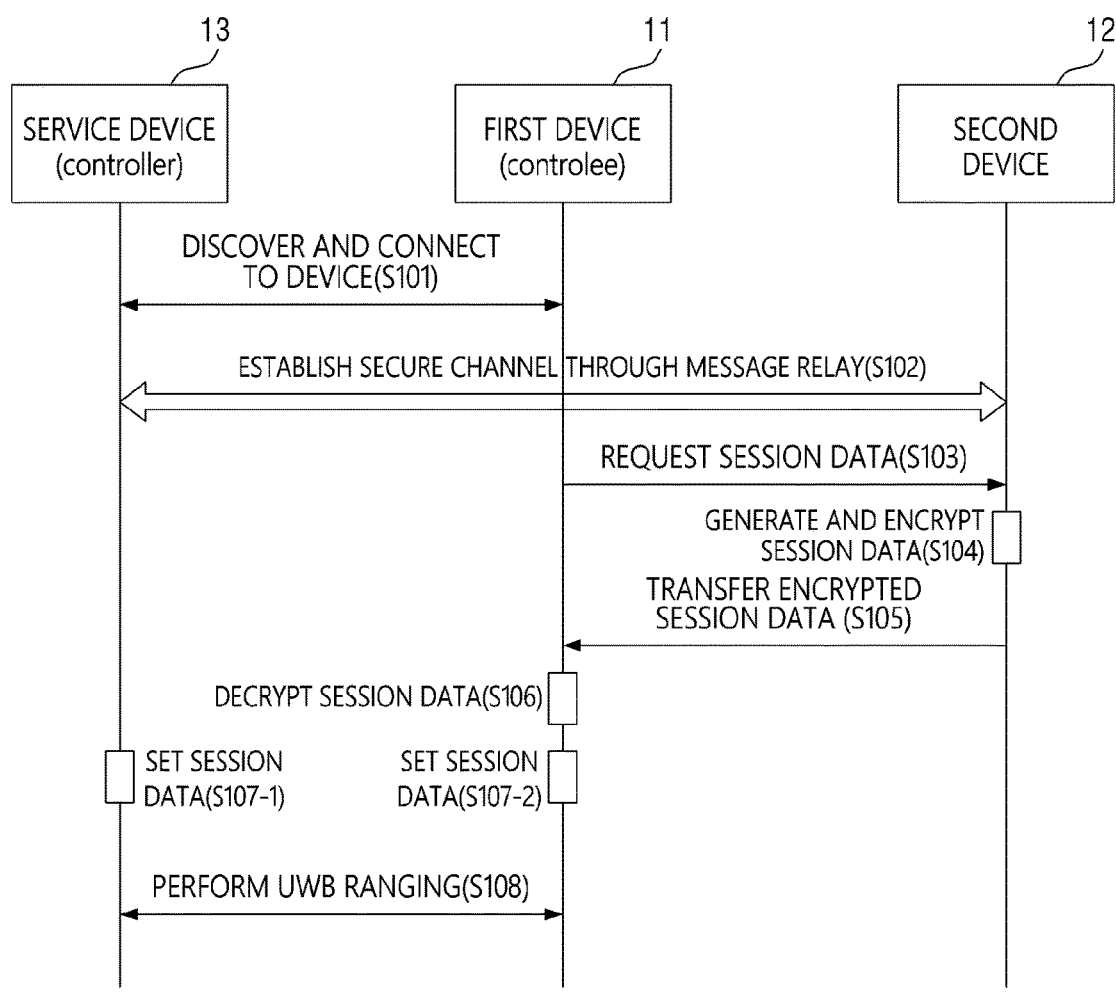
FIG. 10 is an illustrative flowchart illustrating a UWB ranging process according to some other exemplary embodiments of the present disclosure.
Figure 11:
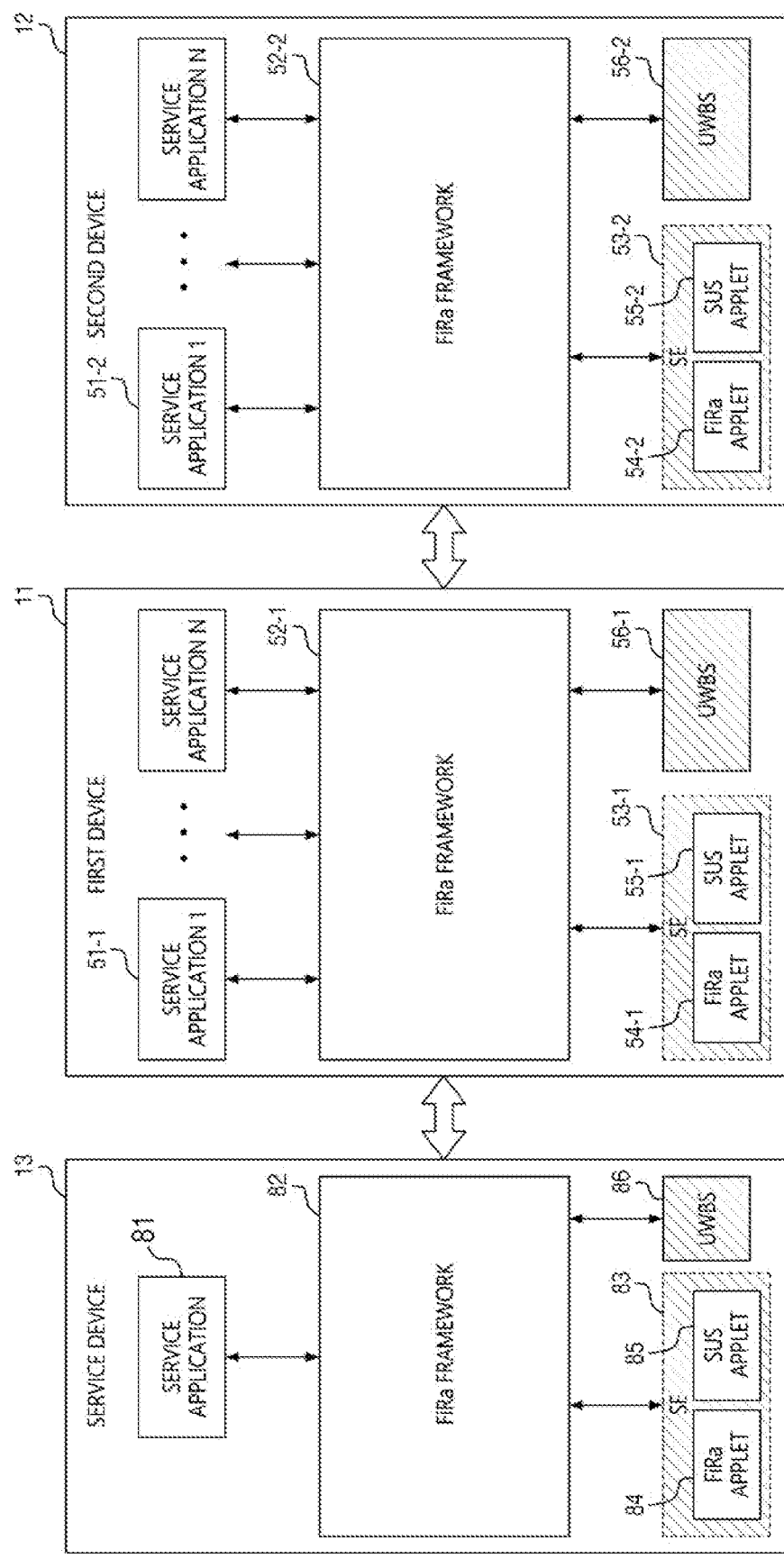
FIG. 11 is an illustrative diagram for describing the UWB ranging process according to some other exemplary embodiments of the present disclosure in detail.

As illustrated in FIG. 10, the present exemplary embodiments relate to a process in which UWB ranging is performed in a dynamic STS mode defined in the FiRa specifications. As described above, the dynamic STS mode may refer to a mode that uses the SE. As illustrated in FIG. 11, the service device 13 operating in the dynamic STS mode may include an SE 83 in which applets 84 and 85 are installed, and the first device 11 and the second device 12 may also include SEs 53-1 and 53-2 in which applets 54-1, 55-1, 54-2 and 55-2 are installed, respectively.

As illustrated in FIG. 10, the present exemplary embodiments may also start in step S101 in which the service device 13 discovers the first device 11 and connects a communication channel with the first device 11. The present step may be performed after FiRa frameworks 82 and 52-1 of two devices 13 and 11 start (initiate) a FiRa service (steps S121-1 and S121-2 in FIG. 12).

Figure 13:
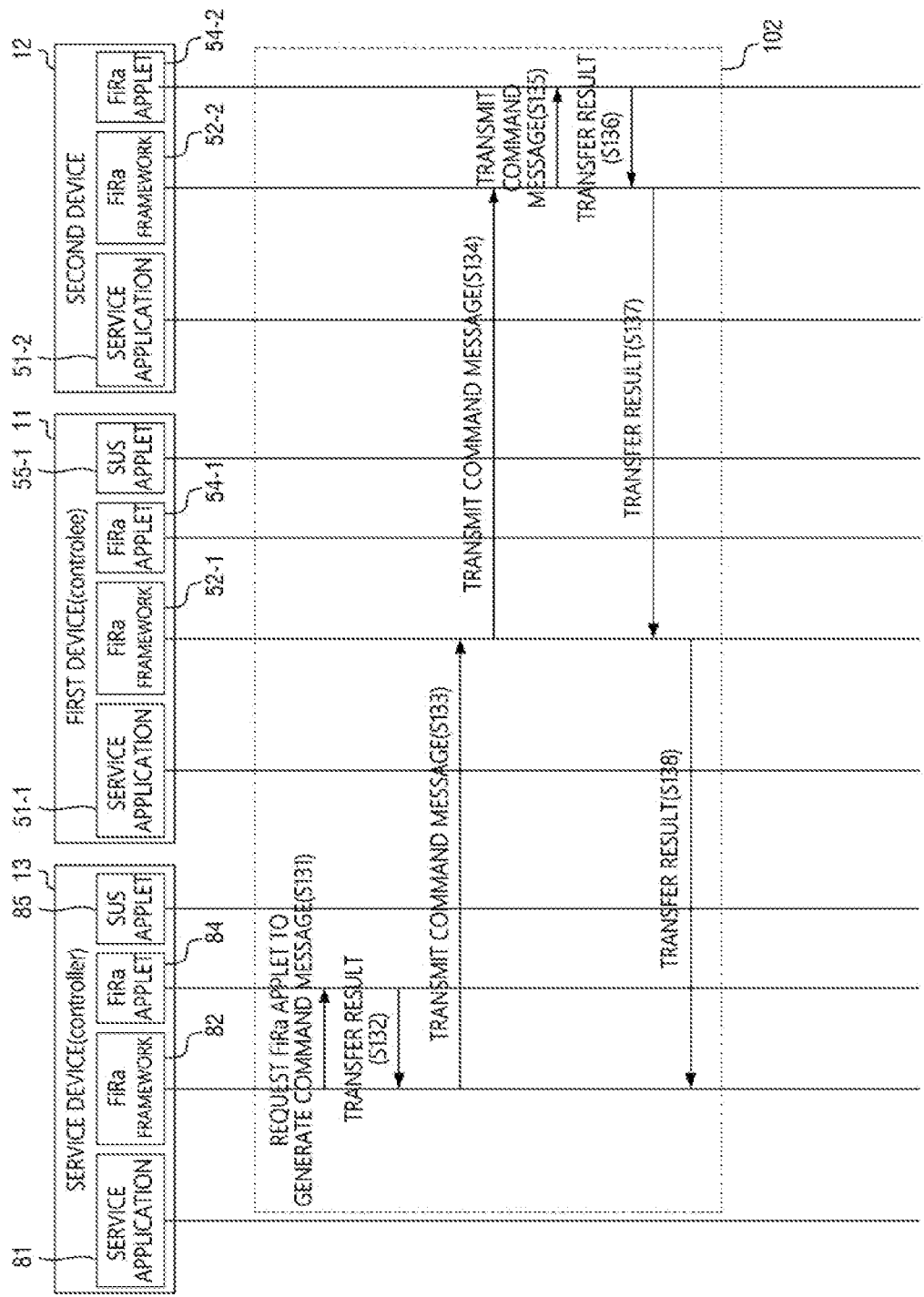

In step S102, a secure channel may be established between the service device 13 and the second device 12 through message relay of the first device 11. As described above, the secure channel may be established according to a method defined in the FiRa specifications. However, the present step is different from the FiRa specifications in that the first device 11 relays a command message for establishing the secure channel. For example, as illustrated in FIG. 13, the first device 11 relays related command messages (e.g., GENERAL AUTHENTICATE PART1, GENERAL AUTHENTICATE PART2, etc.) between two devices 13 and 12, such that the secure channel may be established between the two devices 13 and 12 (see S131 to S138).

For reference, the reason why the service device 13 establishes the secure channel with the second device 12 is that session data for UWB ranging (or basic information for deriving the session data) does not exist in the first device 11. That is, even though the service application is synchronized, data stored in the SE is not synchronized, and thus, the service device 13 may not establish a secure channel with the first device 11. In addition, it may be understood in the same context that the first device 11 performs UWB ranging with the service device 13 using session data of the second device 12.

In step S103, the first device 11 may request the session data for UWB ranging from the second device 12. The request for the session data may be implemented through a 'GET DATA' command defined in the FiRa specifications, but the scope of the present disclosure is not limited thereto.

Figure 12:
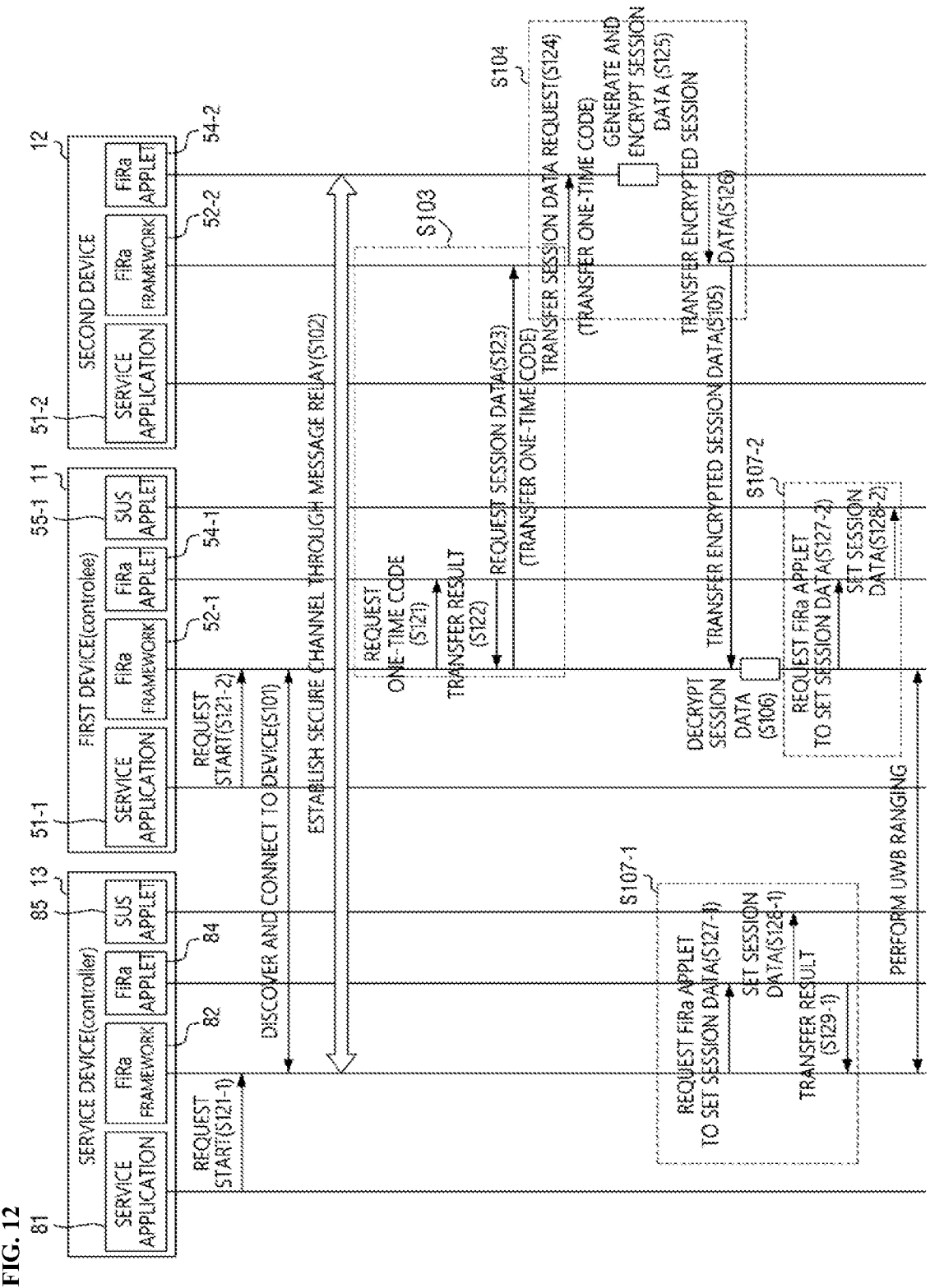
FIGS. 12 and 13 are illustrative detailed flowcharts illustrating a UWB ranging process according to some other exemplary embodiments of the present disclosure.

In some exemplary embodiments, as illustrated in FIG. 12, the first device 11 may transmit a one-time code (e.g., a random value) together with the request for the session data (S121 to S123). The one-time code may be safely generated by the FiRa applet 54-1, and a specific code generation method may be any method. It may be understood that the one-time code is used to more securely share the session data of the second device 12. That is, the session data of the second device 12 may be more safely shared with the first device 11 by further using the one-time code in addition to the encryption key shared in advance.

In step S104, the second device 12 may generate and encrypt the session data. For example, the second device 12 may encrypt the session data using the encryption key shared in a synchronization process. The session data may include, for example, a session ID, a session key, and the like, but is not limited thereto. For detailed data items constituting the session data and a method for generating the session data, reference is made to the FiRa specifications.

In some exemplary embodiments, as illustrated in FIG. 12, the second device 12 may further encrypt the session data by further using the one-time code received from the first device 11 (S124 to S126). The generation and the encryption of the session data may be performed by the FiRa applet 54-2, but a specific encryption method may be variously designed. As an example, the FiRa applet 54-2 may encrypt the session ID using the one-time code and encrypt the session key using the one-time code and the encryption key (e.g., encrypt the session key with the one-time code and then encrypt the session key with the encryption key again, encrypt a portion of the session key with the one-time code and encrypt the other portion of the session key with the encryption key, etc.). It may be understood that this is because the need to protect the session key is higher than the need to protect the session ID. As another example, the FiRa applet 54-2 may encrypt both the session ID and session key using the one-time code and the encryption key.

In step S105, the second device 12 may transfer the encrypted session data to the first device 11.

In step S106, the first device 11 may receive encrypted session data from the second device 12 and decrypt the received encrypted session data. A decryption method may be determined by an encryption method.

In some exemplary embodiments, as illustrated in FIG. 12, the FiRa framework 52-1 of the first device 11 may decrypt the received session data (i.e., the encrypted session data) using the encryption key shared in advance and the one-time code.

In steps S107-1 and S107-2, the service device 13 and the first device 11 may set the session data for UWB ranging. For example, as illustrated in FIG. 12, the FiRa framework 82 or 52-1 of the service device 13 or the first device 11 may transmit the session data to the SUS applet 85 or 55-1 through the FiRa applet 84 or 54-1 and request the SUS applet 85 or 55-1 to set the session data (S127-1 to S129-1, S127-2 and S128-2). In this case, the session data for UWB ranging may be set by the SUS applet 85 or 55-1.

In step S108, UWB ranging may be performed between the first device 11 and the service device 13. For a detailed process of the UWB ranging, reference is made to the FiRa specifications.

Meanwhile, although not illustrated in FIG. 10, a service operation based on a UWB ranging result (i.e., a distance measurement result) may be further performed between the service device 13 and the first device 11. In addition, the first device 11 may display a performance result of the service operation through a display (e.g., 24 of FIG. 2). In this manner, satisfaction of the user using the UWB ranging-based service may be significantly improved.

Till now, the UWB ranging process according to some other exemplary embodiments of the present disclosure has been described with reference to FIGS. 8 to 13. As described above, the first device 11 performs an operation for an ultra-wide band (UWB) ranging-based service with the service device 13 using the service application 51-1 synchronized with the second device 12. Accordingly, the user may use the UWB ranging-based service through the first device 11 even in an environment in which it is difficult to use the UWB ranging-based service through the second device 12 (e.g., an environment in which UWB communication is difficult due to attenuation of a UWB signal). For example, the user may use the UWB ranging-based service through a vehicle device even when he/she rides in a vehicle. Accordingly, service satisfaction of the user may be improved.

Hereinafter, UWB ranging-based services according to some exemplary embodiments of the present disclosure and service scenarios according to the UWB ranging-based services will be described with reference to FIGS. 14 to 17.

First, a UWB ranging-based service according to some exemplary embodiments of the present disclosure and a service scenario according to the UWB ranging-based service will be described with reference to FIGS. 14 and 15.

Figure 14:
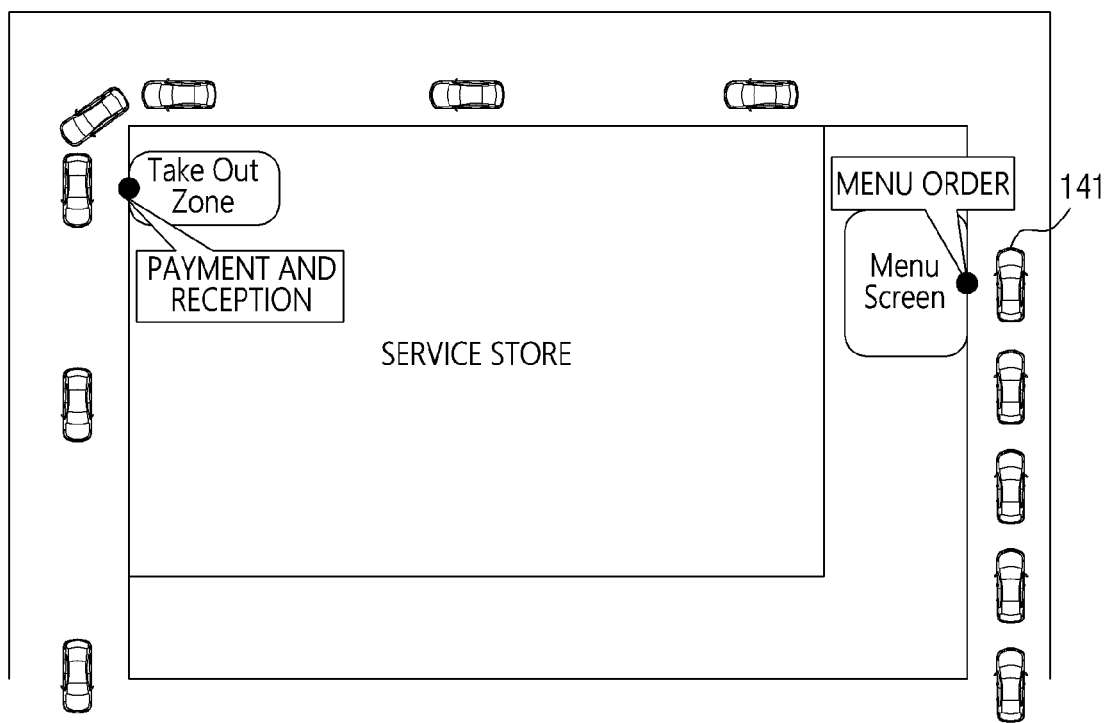
FIGS. 14 and 15 are illustrative diagrams for describing a UWB ranging-based service according to some exemplary embodiments of the present disclosure and a service scenario according to the UWB ranging-based service.
Figure 15:
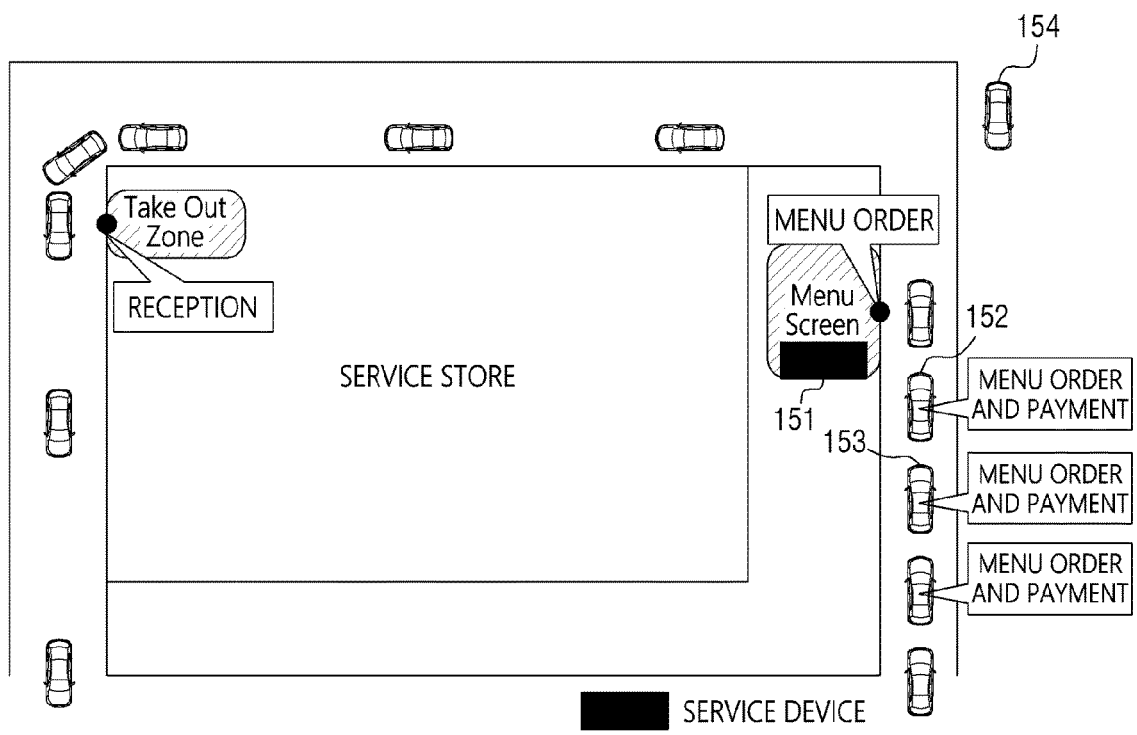

FIG. 14 illustrates an existing take-out service (e.g., a drive-through take-out service), and FIG. 15 illustrates that a take-out service is provided based on UWB ranging.

As illustrated in FIG. 14, the existing take-out service was performed in such a way that the user stops driving the vehicle 141 at an order zone, checks and orders a menu, and then moves to a take-out zone to receive an ordered item. Accordingly, there are problems that the take-out service is not smoothly performed or an average waiting time of users becomes long due to repetitive stopping of vehicles 141, menu checking time, and the like. However, such problems may be easily solved when the take-out service is provided based on UWB ranging.

Specifically, as illustrated in FIG. 15, a service device 151 is installed at a specific zone of a service store, and it is assumed that the service device 151 transmits item information (e.g., various item information such as today's discount items) to devices within a predetermined distance using a UWB ranging result and receives an order.

In this case, when vehicles 152 and 153 enter a predetermined distance from the service device 151, devices of the vehicles 152 and 153 (i.e., vehicle devices linked to mobile devices of users) may display item information through displays (i.e., item information is displayed in the vehicles 152 and 153 when the vehicles 152 and 153 are within the predetermined distance based on a ranging result and item information is not displayed in a vehicle 154). In this case, the users may check the item information through the displays of the vehicles and order desired items without stopping the vehicles through simple operations. Accordingly, an average waiting time of the users may be shortened, and the take-out service may be provided much more smoothly than the existing take-out service.

Next, a UWB ranging-based service according to some other exemplary embodiments of the present disclosure and a service scenario according to the UWB ranging-based service will be described with reference to FIGS. 16 and 17.

Figure 16:
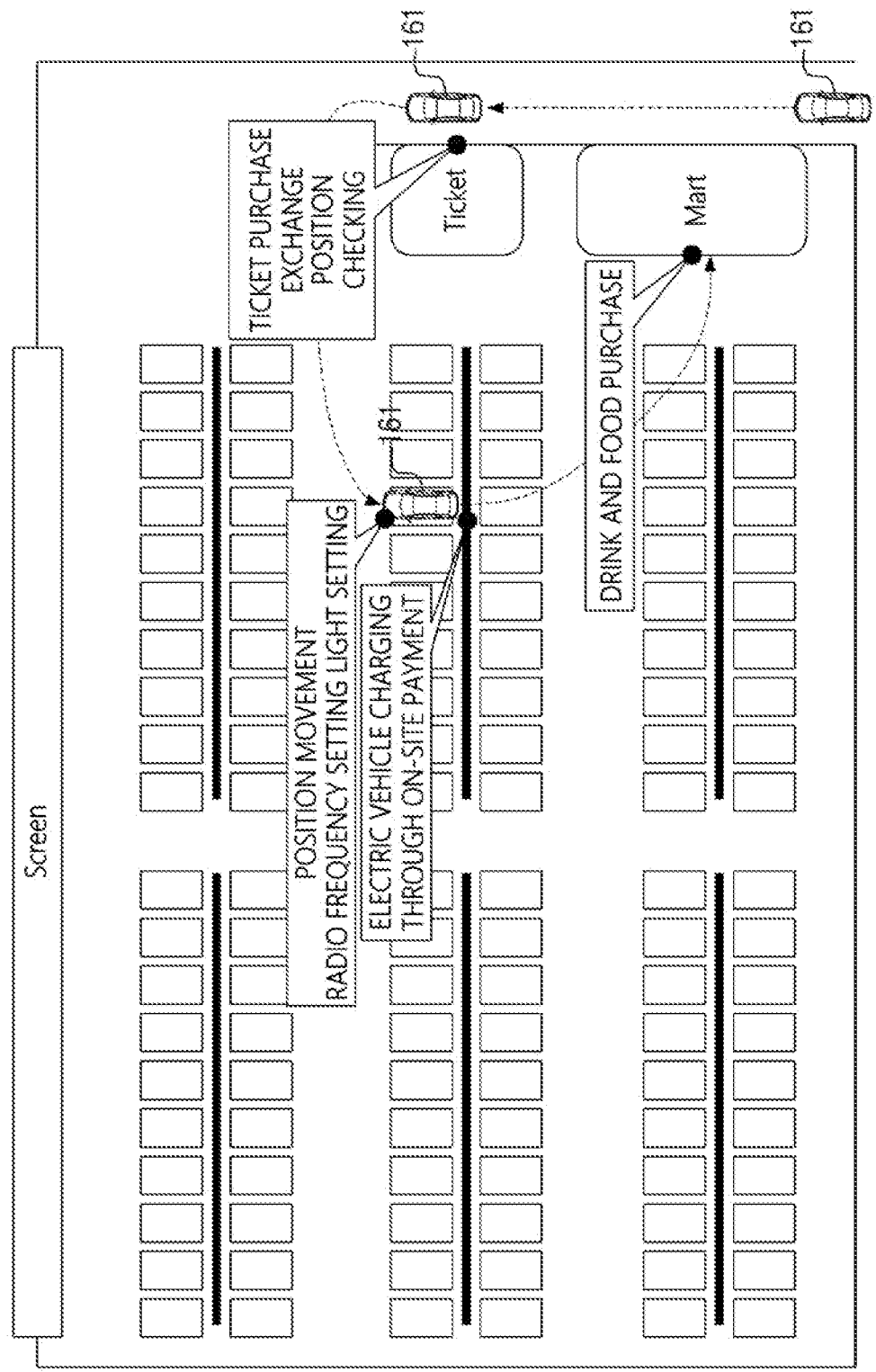
FIGS. 16 and 17 are illustrative diagrams for describing a UWB ranging-based service according to some other exemplary embodiments of the present disclosure and a service scenario according to the UWB ranging-based service.
Figure 17:
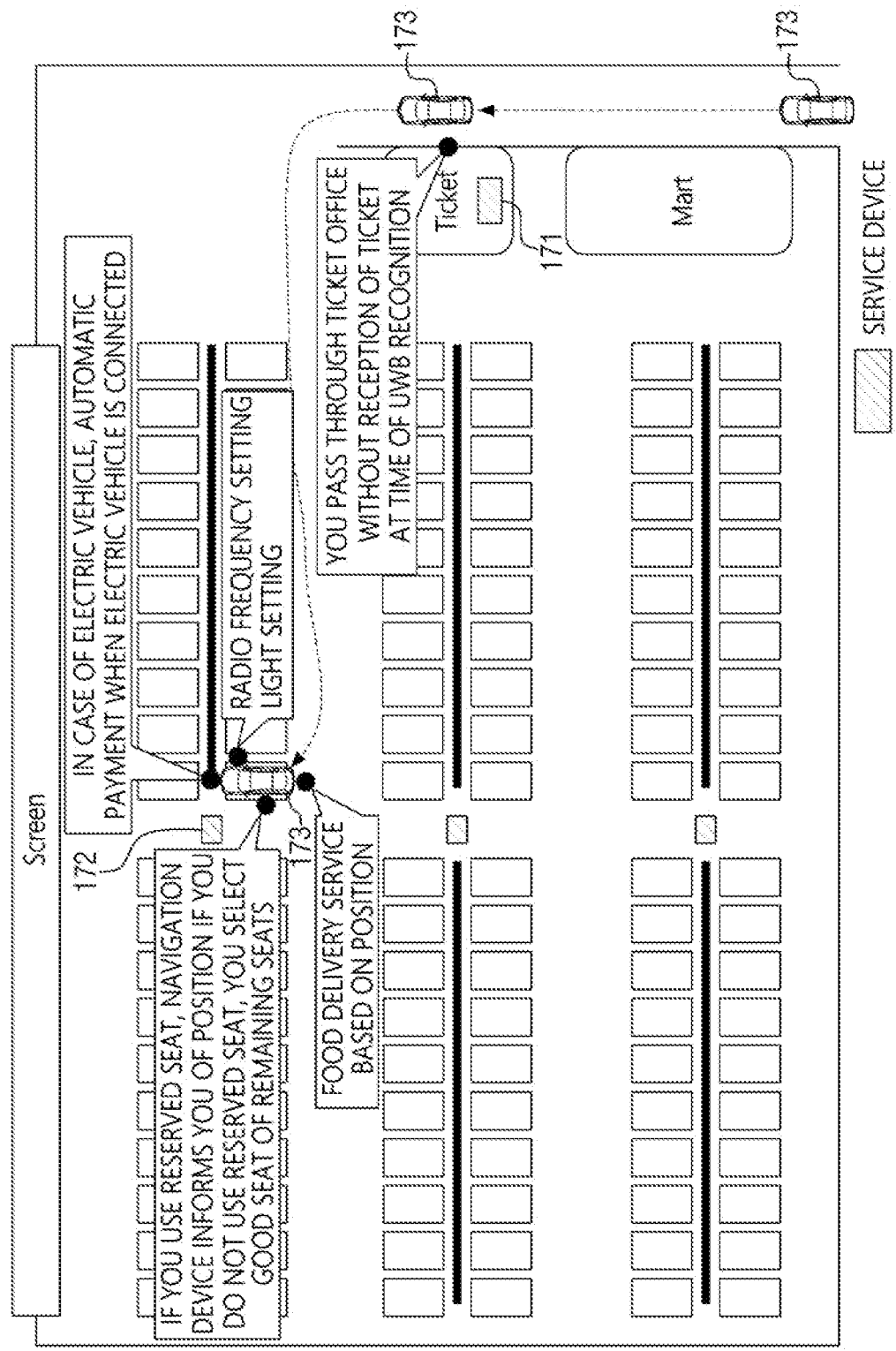

FIG. 16 illustrates an existing drive-in theater service, and FIG. 17 illustrates that a drive-in theater service is provided based on UWB ranging.

As illustrated in FIG. 16, in the existing drive-in theater service, a user should stop driving a vehicle 161, purchase a ticket, pass through a ticket office, and then directly find and move to a viewing spot, which was inconvenient. Furthermore, when the user wants to purchase food, the user should move on foot or by the vehicle 161 and directly purchase the food, which was inconvenient. However, such problems may be easily solved when the drive-in theater service is provided based on UWB ranging.

Specifically, as illustrated in FIG. 17, a user's vehicle 173 may enter a theater without stopping through a service operation (e.g., ranging, ticket purchase, etc.) with a service device 171, and navigation information to a viewing spot may be provided through ranging with a service device 172 installed near the viewing spot. Furthermore, a food delivery service may be provided based on a position (or a ranging results), and a function such as a function of automatically setting a radio frequency and lights of the vehicle 173 through a device of the vehicle 173 may also be provided (e.g., the device of vehicle 173 performs automatic control when the vehicle 173 arrives at the viewing spot). Accordingly, the inconveniences of the existing drive-in theater service may be completely solved.

Hereinafter, an illustrative computing device 180 capable of implementing the above-described devices 11 to 13 will be briefly described with reference to FIG. 18.

Figure 18:
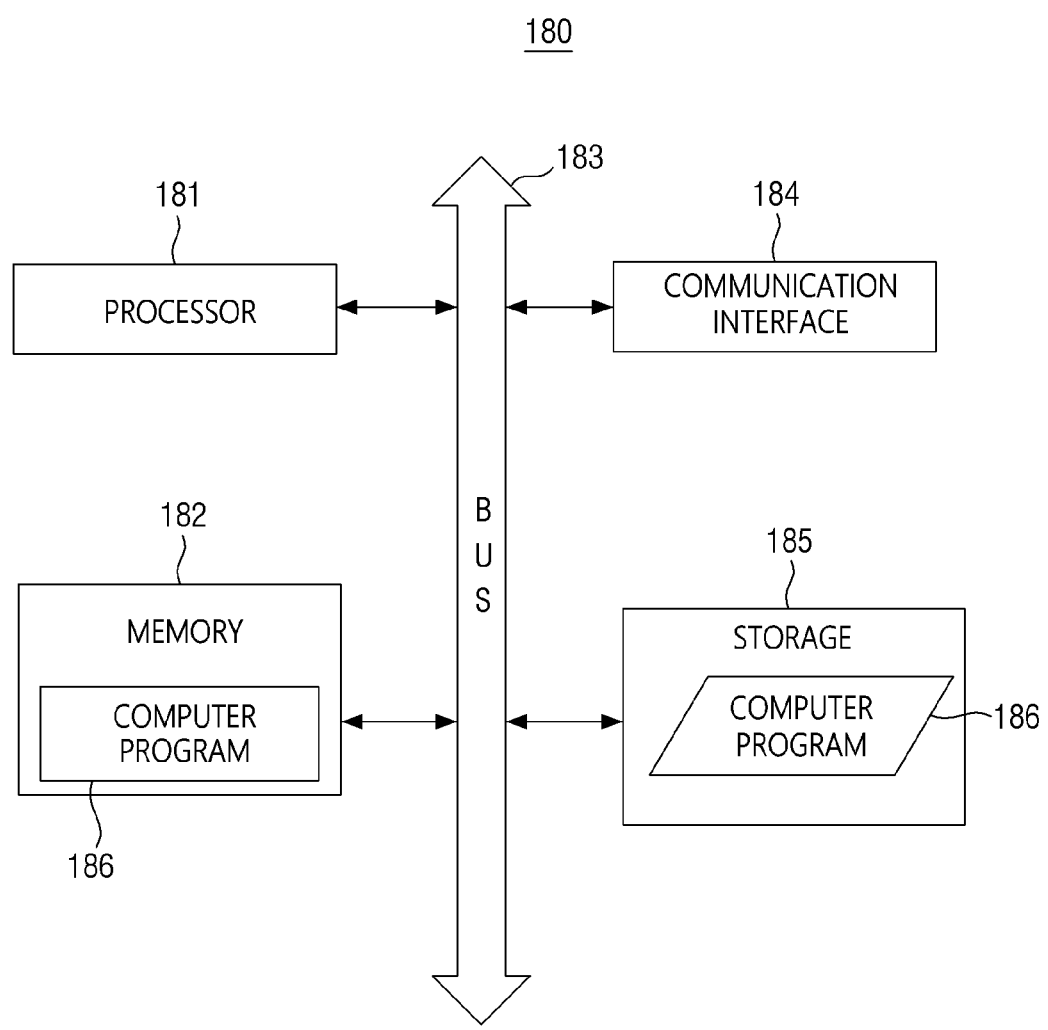
FIG. 18 illustrates an illustrative computing device capable of implementing devices according to some exemplary embodiments of the present disclosure.

FIG. 18 is a hardware configuration diagram of the computing device 180.

As illustrated in FIG. 18, the computing device 180 may include one or more processors 181, a bus 183, a communication interface 182, a memory 184 loading a computer program 186 executed by the processor 181, and a storage 185 storing the computer program 186.

The processor 181 may control the overall operation of each component of the computing device 180. The processor 181 may be configured to include at least one of a central processing unit (CPU), a micro processor unit (MPU), a micro controller unit (MCU), a graphic processing unit (GPU), or any type of processor well known in the art to which the present disclosure pertains. In addition, the processor 181 may perform an arithmetic operation on at least one applet, application, and/or program for executing methods/operations according to various exemplary embodiments of the present disclosure. The computing device 180 may include one or more processors 181.

Next, the memory 184 may store various data, commands, and/or information. The memory 184 may load one or more computer programs 186 from the storage 185 in order to execute the methods/operations according to various exemplary embodiments of the present disclosure. The memory 184 may be, for example, a random access memory (RAM), but is not limited thereto.

Next, the bus 183 may provide a communication function between components of the computing device 180. The bus 183 may be implemented as various types of buses such as an address bus, a data bus, and a control bus.

Next, the communication interface 182 may support wired/wireless communication of the computing device 180. For example, the communication interface 182 may support various types of proximity communication, and may further support various other communication methods. The communication interface 182 may be configured to include a communication module well known in the art to which the present disclosure pertains.

Next, the storage 185 may non-temporarily store one or more computer programs 186. The storage 185 may be configured to include a non-volatile memory such as a flash memory, a hard disk, a removable disk, or any type of computer-readable recording medium well known in the art to which the present disclosure pertains.

The computer program 186 may include one or more instructions in which the methods/operations according to various exemplary embodiments of the present disclosure are implemented. When the computer program 186 is loaded into the memory 184, the processor 181 may perform the methods/operations according to various exemplary embodiments of the present disclosure by executing the loaded instructions.

For example, the computer program 186 may include instructions for performing an operation of synchronizing the service application of the first device 11 with the service application of the second device 12 using the synchronization information received from the second device 12 and an operation of performing an operation for a UWB ranging-based service with the service device 13 through the synchronized service application. In this case, the first device 11 according to some exemplary embodiments of the present disclosure may be implemented through the computing device 180.

As another example, the computer program 186 may include instructions for performing an operation of synchronizing the service application of the second device 12 with the service application of the first device 11 by transmitting the synchronization information to the first device 11 and an operation of transmitting the session data for UWB ranging to the first device 11. In this case, the second device 12 according to some exemplary embodiments of the present disclosure may be implemented through the computing device 180.

Till now, the illustrative computing device 180 capable of implementing the devices 11 to 13 according to some exemplary embodiments of the present disclosure has been described with reference to FIG. 18.

Embodiments of the present disclosure have been described above with reference to FIGS. 1 through 18, but the present disclosure is not limited thereto and may be implemented in various different forms. It will be understood that the present disclosure may be implemented in other specific forms without changing the technical spirit or gist of the present disclosure. Therefore, it should be understood that the embodiments set forth herein are illustrative in all respects and not limiting.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

According to some exemplary embodiments of the present disclosure, a first device may perform an operation for a UWB ranging-based service with a service device using a service application synchronized with a second device. Accordingly, a user may use the UWB ranging-based service through the first device even in an environment in which it is difficult to use the UWB ranging-based service through the second device (e.g., an environment in which UWB communication is difficult due to attenuation of a UWB signal). For example, the user may use the UWB ranging-based service through a vehicle device even when he/she rides in a vehicle. Accordingly, service satisfaction of the user may be improved. Furthermore, since the user may use the UWB ranging-based service through a wide display of the vehicle, the service satisfaction of the user may be further improved.

In addition, since the user does not need to take measures such as installing a service application of the second device in the first device, convenience of the user may be significantly improved. Furthermore, since the first device performs UWB ranging with the service device using session data of the second device, the user does not need to take measures such as setting a UWB communication environment of the first device. Accordingly, the convenience of the user may be further improved.

In addition, the session data of the second device may be safely shared with the first device using an encryption key shared in a synchronization process of the service application. Accordingly, security of the UWB ranging-based service may be sufficiently ensured.

In addition, the UWB ranging-based service is provided in various environments through linkage between devices, and accordingly, the spread of services using a UWB communication technology may be accelerated.

The effects of the present disclosure are not limited to the aforementioned effects, and other effects that are not mentioned herein may be obviously understood by one of ordinary skill in the art from the following description.

In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

What is claimed is:

1. A method for providing an ultra-wideband (UWB) ranging-based service, the method comprising:
    synchronizing, by a first device, a first service application of the first device with a second service application of a second device based on synchronization information received from the second device, the second service application of the second device being an application configured to perform an operation for a UWB ranging-based service in association with a service device; and
    performing, by the first device, the operation for the UWB ranging-based service in association with the service device, based on the synchronized first service application.

2. The method of claim 1, wherein the first device is a device mounted in a vehicle, and
    the second device is a mobile device of a user.

3. The method of claim 2, further comprising controlling, by the first device, to display a result of the performing the operation through a display of the vehicle.

4. The method of claim 1, wherein the synchronizing comprises:
    establishing a secure channel with the second device; and
    sharing an encryption key with the second device through the secure channel, the encryption key being a key based on which session data for UWB ranging is to be encrypted.

5. The method of claim 4, wherein the encryption key is a key different from an encryption key shared in a previous synchronization process between the first device and the second device.

6. The method of claim 4, wherein the performing the operation comprises:
    receiving, from the second device, session data encrypted by the shared encryption key;
    decrypting the received session data based on the encryption key; and
    performing the UWB ranging in association with the service device based on the decrypted session data.

7. The method of claim 6, wherein the receiving the session data comprises:
    transmitting, to the second device, a one-time code and a request for the session data; and
    receiving, from the second device, the session data encrypted by the shared encryption key and the one-time code.

8. The method of claim 7, wherein the received session data comprises:
    a session ID encrypted by the one-time code; and
    a session key encrypted by the shared encryption key and the one-time code.

9. The method of claim 7, wherein the one-time code is generated by a fine ranging (FiRa) applet driven in a secure element (SE) of the first device.

10. The method of claim 1, wherein the performing the operation comprises:
    relaying a message for establishing a secure channel between the service device and the second device, the secure channel being established between the service device and the second device as a result of relaying the message;
    receiving session data for UWB ranging from the second device; and
    performing the UWB ranging in association with the service device based on the received session data.

11. The method of claim 1, wherein the service device operates in a static scrambled timestamp sequence (STS) mode, and
    the performing the operation comprises:
    sharing session data with the service device; and
    performing UWB ranging in association with the service device based on the shared session data.

12. A method for providing an ultra-wideband (UWB) ranging-based service, the method comprising:
    synchronizing, by a second device, a second service application of the second device with a first service application of a first device by transmitting synchronization information to the first device, the second service application of the second device being an application configured to perform an operation for a UWB ranging-based service in association with a service device; and
    transmitting, by the second device to the first device, session data for UWB ranging, based on which the UWB ranging is performed between the service device and the first device.

13. The method of claim 12, wherein the synchronizing comprises:
    establishing a secure channel with the first device; and
    sharing an encryption key with the first device through the secure channel, and
    the transmitting the session data comprises:
    encrypting the session data with the shared encryption key; and
    transmitting the encrypted session data to the first device.

14. The method of claim 13, wherein the session data includes a session ID and a session key, and
    the encrypting the session data comprises:
    encrypting the session ID based on a one-time code received from the first device; and
    encrypting the session key based on the one-time code and the shared encryption key.

15. The method of claim 13, wherein the encryption key is a key different from an encryption key shared in a previous synchronization process between the first device and the second device.

16. The method of claim 12, wherein the service device operates in a dynamic static scrambled timestamp sequence (STS) mode, and
the service device establishes a secure channel with the second device through relay of the first device.

17. A device comprising:
at least one processor;
a communication interface configured to communicate with a service device and another device; and
at least one memory configured to store one or more instructions,
wherein the at least one processor, based on executing the one or more instructions, is caused to perform:
synchronizing a first service application of the device with a second service application of the another device based on synchronization information received from the another device, the second service application of the another device being an application configured to perform an operation for an ultra-wideband (UWB) ranging-based service in association with the service device; and
performing the operation for the UWB ranging-based service in association with the service device, based on the first service application.

* * * * *